United States Patent
Langley (10) Patent No.: US 9,385,868 B2
(45) Date of Patent: Jul. 5, 2016

(54) METHODS AND SYSTEMS FOR TESTING PERFORMANCE OF BIOMETRIC AUTHENTICATION SYSTEMS

(75) Inventor: Richard Jay Langley, Vienna, VA (US)

(73) Assignee: DAON HOLDINGS LIMITED, George Town (KY)

( * ) Notice: Subject to any disclaimer, the term of this patent is extended or adjusted under 35 U.S.C. 154(b) by 503 days.

(21) Appl. No.: 12/975,853

(22) Filed: Dec. 22, 2010

(65) Prior Publication Data

US 2012/0167183 A1 Jun. 28, 2012

(51) Int. Cl.
*H04L 9/32* (2006.01)
(52) U.S. Cl.
CPC .................................. *H04L 9/3231* (2013.01)
(58) Field of Classification Search
CPC ..................................................... H04L 9/2331
See application file for complete search history.

(56) References Cited

U.S. PATENT DOCUMENTS

2007/0150745 A1\* 6/2007 Peirce et al. ................... 713/186
2007/0253624 A1\* 11/2007 Becker .......................... 382/225

\* cited by examiner

*Primary Examiner* — Brandon Hoffman
*Assistant Examiner* — Nega Woldemariam
(74) *Attorney, Agent, or Firm* — Kevin McDermott, Esq.

(57) ABSTRACT

A method of testing the performance of a biometric authentication system includes conducting an initial biometric authentication transaction for an individual using data associated with the individual, and generating an initial result for the initial transaction with the biometric authentication system. Moreover, the method includes obtaining additional data associated with the individual when the additional data is required for conducting a subsequent biometric authentication transaction or after randomly determining that the subsequent transaction is to be conducted. Furthermore, the method includes conducting the subsequent transaction, generating a subsequent result for the subsequent transaction with the biometric authentication system, and updating cumulative performance records based on the initial and subsequent results. The method also includes generating a summary on a temporal or quantifiable basis that includes the cumulative performance records, and determining the performance of the biometric authentication system using the cumulative performance records or the summary.

8 Claims, 5 Drawing Sheets

METHODS AND SYSTEMS FOR TESTING PERFORMANCE OF BIOMETRIC AUTHENTICATION SYSTEMS

BACKGROUND OF THE INVENTION

This invention relates generally to testing performance of computer systems, and more particularly, to methods and systems for testing performance of biometric authentication computer (BAC) systems.

During authentication transactions, BAC systems execute 1:1 verification matching algorithms stored therein to confirm whether a person is who he or she claims to be or, alternatively, execute 1:N matching algorithms stored therein to identify an unknown person or determine if a person is already in a database. These matching algorithms typically compare a series of probes against a gallery of data records stored in the BAC system. The identity of a person is verified as the result of a successful 1:1 verification, or determined as the result of a 1:N identification when biometric data included in a probe matches biometric data included in a data record corresponding to the person. Data generated as a result of these comparisons may be used to determine BAC system performance metrics such as, but not limited to, accuracy and false accept rate.

Biometric data test records each include a pair of biometric records. A first record of the pair is known as a probe and is used in test matching transactions. A second record of the pair is known as a seed and is inserted, or otherwise ensured to be in the gallery when the probe is processed. While testing BAC system performance, the gallery is searched for the seed records using the known matching probes such that the rate at which seed records are not detected as well as the frequency that spurious matches are detected can be determined. However, because accuracy and selectivity of matching algorithms degrade during 1:N transactions as the number of data records in the gallery increases, known testing techniques cannot be effectively implemented in BAC systems responsible for managing hundreds of millions of identities.

It has been known to manually generate test data for testing BAC system performance by obtaining probe-seed record pairs of biometric samples from test volunteers and enrolling the seed record of the pair into an existing gallery of biometric data records. However, manually generating such probe-seed record pairs as test data is known to be very expensive. Moreover, because such test data is generally valid for only a single blind test and most BAC systems require regular testing to validate performance, regular testing of the performance of BAC systems is generally considered to be prohibitively expensive. Furthermore, although manually generated test data provides some measurement of BAC system performance, the results may not be representative of performance with operational data and may be of little value.

BRIEF DESCRIPTION OF THE INVENTION

In one aspect, a method of testing the performance of a biometric authentication system is provided. The method includes conducting an initial biometric authentication transaction for an individual using data associated with the individual, and generating an initial result for the initial transaction with the biometric authentication system. The biometric authentication system stores operational data therein. Moreover, the method includes obtaining additional data associated with the individual when the additional data is required for conducting a subsequent biometric authentication transaction or after randomly determining that the subsequent transaction is to be conducted. Furthermore, the method includes conducting the subsequent transaction, generating a subsequent result for the subsequent transaction with the biometric authentication system, and updating cumulative performance records based on the initial and subsequent results. The method also includes generating a summary on a temporal or quantifiable basis that includes the cumulative performance records, and determining the performance of the biometric authentication system using the cumulative performance records or the summary.

In another aspect a computer for processing biometric authentication matching transactions is provided that includes a processor and a database. The database is for storing at least a gallery of data records for each of a plurality of users, policies, and processed results of matching transactions as cumulative performance records. Each data record includes biometric data of one of the users, the policies determine biometric data to be obtained from an individual, and each cumulative performance record maintains a count for each one of a plurality of different performance metrics of the computer.

The computer is operable to communicate with at least one client system and is programmed to conduct an initial biometric authentication matching transaction for the individual and generate an initial result for the initial transaction. Moreover, the computer is operable to communicate with the at least one client system to obtain additional data associated with the individual when additional data is required for conducting a subsequent biometric authentication matching transaction, or after randomly determining that the subsequent biometric authentication matching transaction is to be conducted. Furthermore, the computer is operable to conduct a subsequent biometric authentication matching transaction for the individual, generate a subsequent result for the subsequent transaction, use the initial result as an expected result of the subsequent transaction, and update the cumulative performance records for the subsequent transaction. The computer is also operable to determine on a temporal or quantifiable basis whether a summary including the cumulative performance records is to be generated and provided to an operator of the computer, wherein the operator determines the performance of the computer using the cumulative performance records included in the summary.

In yet another aspect, a system for testing the performance of biometric authentication computer systems is provided. The system includes a biometric authentication computer system that includes at least a database. The computer system is configured to store within the database at least a gallery of data records, policies, and results of matching transactions. Moreover, the system includes at least one client system operable to communicate with the computer system, and configured to receive a request to obtain biometric data, obtain biometric data associated with an individual, and transmit the obtained biometric data to the computer system.

The computer system is operable to communicate with the at least one client system and is further configured to conduct at least initial and subsequent biometric authentication matching transactions, and generate a result for each matching transaction. Moreover, the computer system is configured to update cumulative performance records based on the generated results, and determine on a temporal or quantifiable basis whether a summary including the cumulative performance records is to be generated and provided to an operator of the computer system.

DETAILED DESCRIPTION OF THE INVENTION

Figure 1:
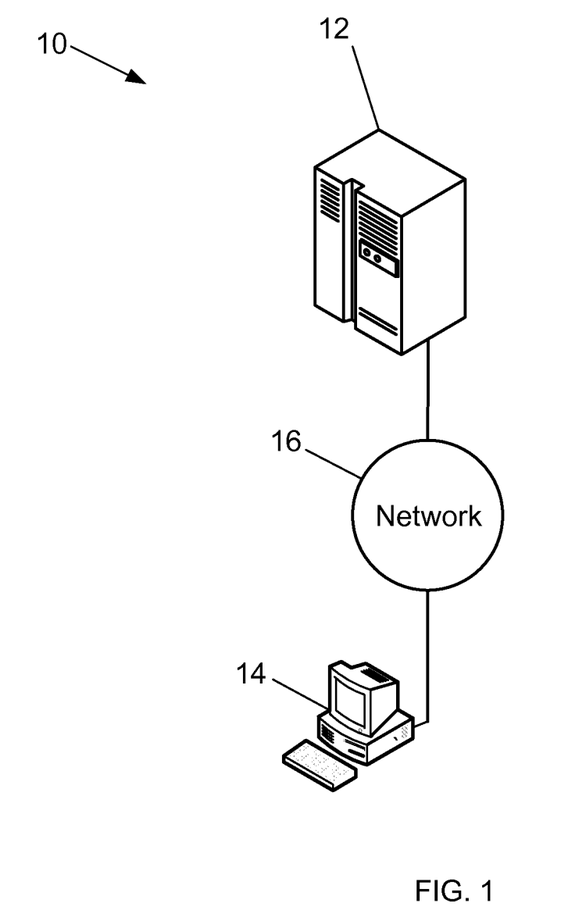
FIG. 1 is an expanded block diagram of an exemplary method of a system architecture of a Continuous Testing Computer (CTC) System.

FIG. 1 is a block diagram of an exemplary embodiment of a Continuous Testing Computer (CTC) system 10 used for testing the performance of a biometric authentication computer system with data processed by the biometric authentication computer system. More specifically, the CTC system 10 includes a Biometric Authentication Computer (BAC) system 12 and a client computer system 14.

In the exemplary embodiment, the BAC system 12 includes components such as, but not limited to, a database server, an application server, a directory server and a disk storage unit arranged to be combined in a single structure. The disk storage unit may store any kind of data. In other embodiments any other type of storage unit may be provided that is capable of storing data. Although these components are combined to form a single structure in the form of the BAC system 12 in the exemplary embodiment, it should be appreciated that in other embodiments these components may be separately positioned at different locations and operatively coupled together in a network such as, but not limited to, a local area network (LAN), a wide area network (WAN), and the Internet. The BAC system 12 is typically configured to communicate with end users at the client computer system 14 using a Local Area Network (LAN) 16. However, it should be appreciated that in other embodiments, the BAC system 12 may communicate with end users at the client computer system 14 as well as other different biometric authentication systems via any kind of network including, but not limited to, a Wide Area Network (WAN) and the Internet.

The BAC system 12 is configured to store at least a gallery of authentication data records. The authentication data is biometric data that corresponds to any biometric modality desired to be used as the basis of authenticating the identity of an individual. Moreover, the BAC system 12 is configured to conduct any type of authentication matching transaction with any biometric modality associated with individuals to biometrically authenticate such individuals. Such authentication matching transactions include, but are not limited to, 1:1 verification transactions and 1:N identification search transactions where N is the number of authentication data records being searched in the gallery. The BAC system 12 may conduct the matching transactions using any method of matching such as, but not limited to, mathematical similarity comparisons, progressing through a sequence of binary logic rules, and a combination of mathematical similarity comparisons and binary logic rules that determine whether a match has occurred.

Fingerprint is the required biometric modality for conducting authentication matching transactions in the exemplary methods described herein. It should be appreciated that in other methods biometric data corresponding to any biometric modality may be used in such authentication transactions including, but not limited to, face, iris, voice and any multi-modal combination of biometric modalities. In order to facilitate properly authenticating identities, the BAC system 12 stores the biometric data, in the form of authentication data records, for each of a plurality of users enrolled therein. The biometric data is included in the authentication data records as biometric template data. The authentication data records together constitute the gallery of authentication record data stored in the BAC system 12. The authentication data records are also referred to herein as data records. Although the biometric data is included in the data records as biometric template data in the exemplary embodiment, it should be appreciated that in other embodiments the biometric data may be included in the data records in any form that facilitates processing authentication matching transactions by biometric authentication systems as described herein. Such other forms include, but are not limited to, images, photographs and electronic data representations.

The BAC system 12 also stores therein authentication policies that are used to determine the biometric data to be obtained from an individual during an authentication matching transaction. Moreover, the BAC system 12 stores therein policies to be used in processing potential matches. Furthermore, the BAC system 12 is configured to generate and store therein results of authentication matching transactions, and process the results to generate and update cumulative performance records, and store the cumulative performance records therein.

A cumulative performance record is a counter that maintains a number that can be mathematically combined with other cumulative performance records to calculate performance metrics such as, but not limited to, false rejection rate (FRR), false acceptance rate (FAR), or accuracy of a BAC system. Cumulative performance records include counts of events that may then be used to calculate the desired performance metrics, and thus reflect the performance of biometric authentication systems. Cumulative performance records may also include an indication of which records were returned as matches in authentication matching transactions, or any other information that may be collected on a transaction-by-transaction basis to support calculation of desired performance metrics. The BAC system 12 may establish a cumulative performance record counter to maintain a number for each one of a plurality of events. Such performance events include, but are not limited to, a number of 1:1 verification transactions, whether a 1:1 verification transaction determined a true match or a false match, a number of 1:N identification search transactions, a number of matches determined for all 1:N identification search transactions, a number of true matches determined for all 1:N identification search transactions, a number of false matches determined for all 1:N identification search transactions, a number of confirmed matches resulting from 1:1 verification transactions, a number of unconfirmed matches resulting from 1:1 verification transactions, and a number of false non-matches where the true match was not identified. Note that in other embodiments the cumulative performance records may be stored on systems different than the BAC system 12.

As the result of 1:N identification search transactions, the BAC system 12 may not determine any matches or may determine at least one match. Each match determined as the result of a 1:N transaction is considered to be a potential match because each match is not necessarily a true match. Potential matches that are not true matches are false matches. Additionally, the BAC system 12 may determine a match or non-match as the result of a 1:1 verification transaction.

It should be understood that data, including but not limited to biometric data, submitted to the BAC system 12 as part of a well-known process for matching during authentication matching transactions is known as operational data. Moreover, any data stored in the BAC system 12 may be considered operational data. Such operational data includes, but is not limited to, biometric data and other data included in matching transactions processed by the BAC system 12, data records included in the gallery, and cumulative performance records. The BAC system 12 is an operational system.

In the exemplary embodiment, the client computer system 14 may be a computer system associated with an entity that administers programs requiring rigorous identity authentication. Such programs include, but are not limited to, driver licensing programs, Visa programs, pension programs, national identity programs, offender programs, welfare programs and taxpayer registration programs. The client system 14 may also be used to manage and administer a plurality of such programs.

The client computer system 14 is configured to communicate with the BAC system 12. Moreover, the client computer system may include devices, such as, but not limited to, a CD-ROM drive for reading data from computer-readable recording mediums, such as a compact disc-read only memory (CD-ROM), a magneto-optical disc (MOD) and a digital versatile disc (DVD). Additionally, the client computer system includes a memory (not shown). Moreover, the client computer system 14 may include display devices, such as, but not limited to, liquid crystal displays (LCD), cathode ray tubes (CRT) and color monitors. Furthermore, the client computer system may include printers and input devices such as, but not limited to, a mouse (not shown), keypad (not shown), a keyboard, a microphone (not shown), and biometric capture devices (not shown). Thus, the client system 14 is capable of capturing biometric data from individuals and of obtaining biometric data of individuals from other different computer systems. Although the exemplary embodiment described herein includes a single client computer system 14 communicating with the BAC system 12, in other embodiments any number of client computer systems 14 may be in communication with the BAC system 12. It should be understood that such other embodiments may not include any client computer systems 14. When such other embodiments do not include any client computer systems 14, the BAC system 12 performs the functions that would otherwise be performed by the client computer systems 14.

The BAC system 12 and the client system 14 each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processor executes instructions, or computer programs, stored in authentication server memory (not shown). The above examples are exemplary only, and are thus not intended to limit in any way the definition and/or meaning of the term "processor."

The memory (not shown) in the application server of BAC system 12 and in the client system 14, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory (not shown) of the BAC system 12 and the memory (not shown) of the client system 14, is used to store executable instructions, applications or computer programs, therein. The terms "computer program" and "application" are each intended to encompass an executable program that exists permanently or temporarily on any computer-readable recording medium that causes the computer or computer processor to execute the program. In the exemplary methods described herein, at least one computer program that causes the BAC system 12 to execute at least one biometric authentication matching algorithm is stored in the memory of the BAC system 12. The at least one computer program causes the BAC system 12 to execute authentication matching algorithms in order to conduct authentication matching transactions including, but not limited to, 1:1 verification transactions and 1:N identification transactions. Thus, the BAC system 12 is configured to conduct any type of authentication matching transaction using any biometric modality to process biometric authentication transactions. An operator of the BAC system 12 may review at least matching transaction results. Such operators include, but are not limited to, biometric analysts.

Although the BAC system 12 is configured to store authentication data and authentication policies therein, and to authenticate individuals in the exemplary embodiment, it should be understood that in other embodiments the client system 14 may be configured to store authentication data and authentication policies therein. Moreover, in other embodiments the client system 14 may be configured to conduct any type of authentication matching transaction. Although the BAC system 12 determines the required biometric data in the exemplary methods described herein, it should be appreciated that in other methods the client system 14 may determine the required biometric data and initiate collection of the required data.

It should be understood that when captured or obtained biometric data and a corresponding data record are compared and are manually checked to ensure they to belong to the same person, the captured or obtained biometric data and the corresponding data record are considered to be a match that has been confirmed. It should be understood that a confirmed match is a match from a 1:N identification transaction that has been reviewed and confirmed by a person, and that a successful 1:1 verification transaction match indicates that a claim of identity has been successfully verified by an algorithm.

Figure 2:
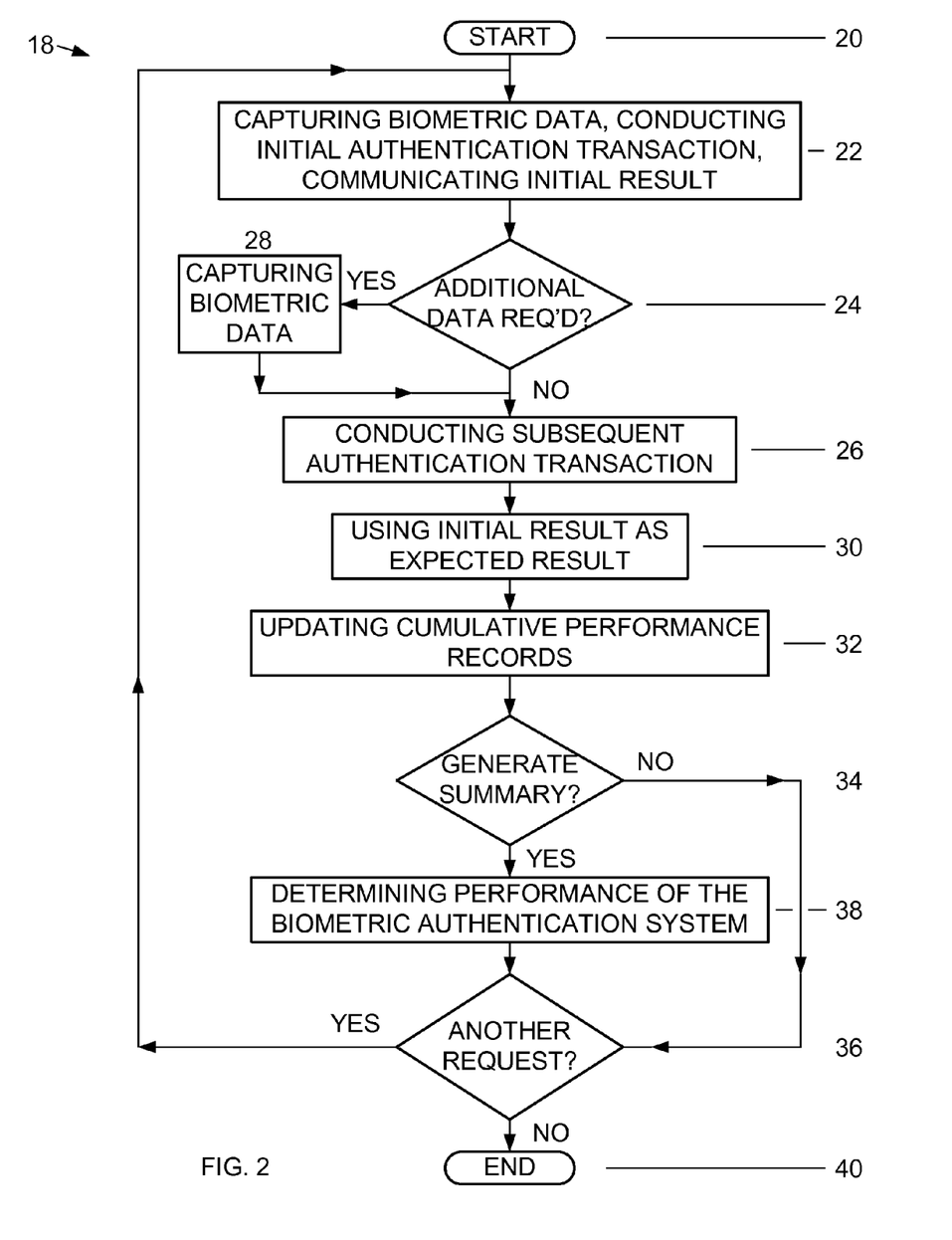
FIG. 2 is a flowchart illustrating a first exemplary method for testing performance of a biometric authentication computer (BAC) system.

FIG. 2 is a flowchart 18 illustrating a first exemplary method for testing the performance of the BAC system 12 using successful 1:1 verification transaction matches as test probes in a 1:N identification transaction conducted to test the performance of the BAC system 12. The method starts 20 by communicating a request for authentication from the client system 14 to the BAC system 12. The request for authentication includes at least a claim of identity for an individual requiring authentication. Upon receiving the request for authentication, the BAC system 12 determines an initial biometric authentication matching algorithm for conducting an initial authentication matching transaction, a subsequent biometric authentication matching algorithm for conducting a subsequent authentication matching transaction, and biometric data required by each of the algorithms to be captured for authentication. The initial and subsequent algorithms may require biometric data of the same or different modality, or different data within the same biometric modality such as, for example, additional fingerprints. Next, the BAC system 12 communicates a message to the client system 14 requesting that the biometric data required by the initial algorithm be captured from the individual. Biometric data required by the initial algorithm 22 is captured from the individual at the client system 14 and is communicated from the client system 14 to the BAC system 12.

Next, processing continues by conducting an initial authentication matching transaction 22 and generating a result for the initial transaction. Specifically, processing continues by including the captured biometric data in a verification probe, obtaining a data record from the gallery corresponding to the claim of identity, and conducting the initial authentication matching transaction 22 in accordance with the initial algorithm. The verification probe may include data, in addition to the captured biometric data, such as, but not limited to, other biometric data and a claim of identity. The initial algorithm 22 conducts a 1:1 verification transaction and communicates an initial result from the BAC system 12 to the client system 14. Thus, in the first exemplary method the initial authentication transaction is a 1:1 verification transaction. The 1:1 verification result constitutes the result of the initial transaction and is the initial result. When the obtained data record and verification probe are a successful match, the verification probe and obtained data record are identified as a matching test probe and seed data record, respectively. However, when the verification probe and the obtained data record do not match, the verification probe and data record are identified as a non-matching test probe and seed data record. The matching test probe and seed data record are also identified as a test probe-seed pair that may be used to test the performance of biometric authentication systems different than the BAC system 12. It should be understood that in the first exemplary method the obtained data record is already included in the gallery prior to conducting the initial transaction. In other methods, the obtained data record is added to an existing gallery of at least one of the different authentication systems prior to conducting a subsequent authentication transaction on the at least one different authentication system.

The BAC system 12 continues processing by determining 24 whether additional biometric data is required to conduct the subsequent authentication matching transaction. Specifically, the BAC system 12 determines the biometric data required by the subsequent algorithm to conduct the subsequent authentication matching transaction. In the first exemplary method the subsequent transaction is a 1:N identification search transaction. When the verification probe includes all of the biometric data required for conducting the subsequent matching transaction, it is determined that additional biometric data is not required and the verification probe may be used as a test probe for the subsequent transaction. The test probe for the subsequent transaction is referred to herein as the 1:N identification search transaction test probe. Processing continues by conducting the subsequent matching transaction 26 in accordance with the subsequent algorithm using the verification probe as the 1:N identification search transaction test probe.

However, when the verification probe does not include all of the biometric data for conducting the subsequent transaction, additional biometric data is required 24. It should be appreciated that biometric data not included in the verification probe, but required for conducting the subsequent transaction, is the additional biometric data. Processing continues by capturing the additional biometric data 28 from the individual at the client system 14. It should be understood that in other methods the additional biometric data may be obtained 28 by any means that facilitates efficiently collecting such data. Such means include, but are not limited to, extracting the additional biometric data from other databases positioned at different locations than the client system 14, or automatically reading the additional biometric data from identity documents. Such identity documents include, but are not limited to, passports and driver's licenses.

In the first exemplary method all of the captured biometric data is included in the verification probe and the 1:N identification search transaction test probe as biometric template data to facilitate matching against the data records in the gallery. However, in other methods the biometric data may be included in the verification probe and 1:N identification transaction test probe in any form that facilitates matching against the data records in the gallery including, but not limited to, raw captured biometric data, images, photographs, and electronic data representations. The additional biometric data is communicated from the client 14 to the BAC system 12.

Next, processing continues by including the additional biometric data in the verification probe. After including the additional biometric data in the verification probe, the verification probe may be used as the 1:N identification search transaction test probe. In the first exemplary method the additional biometric data supplements the biometric data included in the verification probe. In other methods the additional biometric data may be included in the verification probe such that the additional biometric data replaces the biometric data included in the verification probe. Processing continues by conducting the subsequent authentication matching transaction 26 and generating a result for the subsequent transaction. Specifically, processing continues by conducting the subsequent transaction 26 in accordance with the subsequent algorithm, using the 1:N identification search transaction test probe. The subsequent transaction may not determine any potential matches or may determine at least one potential match as the result. The result of the subsequent transaction is referred to in the first exemplary method as the subsequent result. Potential matches included in the subsequent result may each be a true match or a false match.

The result of the initial transaction may be used as an expected result of the subsequent transaction 26. Consequently, the process continues by using the initial result as the expected result 30 of the subsequent transaction. Thus, after conducting the subsequent transaction 26 the initial result is used 30 to determine whether any potential match included in the subsequent result is a true match or a false match 30, or whether the subsequent authentication transaction failed to determine a true match. Specifically, processing continues by comparing any potential matches included in the subsequent result against the seed data record determined during the initial transaction to determine true matches. Any potential matches included in the subsequent result that fail to match the seed data record are considered potential false matches. The potential false matches included in the subsequent result are compared against the 1:N identification search transaction test probe by the operator of the BAC system 12 to determine whether the potential false matches are true or false matches. Operator review of potential false matches is required only if the subsequent transaction is processed on an authentication system where true matches other than with the seed data record are possible. Otherwise, the authentication system itself determines true and false matches based on whether the records returned as matches correspond to seed records, or not.

In the first exemplary method, the BAC system 12 processes the initial and subsequent results to update cumulative performance records stored therein. After determining whether any potential match included in the subsequent result is a true match or a false match, or determining that there were no potential matches and that the lack of potential matches represents a false non-match, processing continues by updating 32 each of the cumulative performance records affected by the initial and subsequent transactions. Specifically, each of the cumulative performance records affected by the initial and subsequent transactions is incrementally increased. For example, when all of the matches included in the subsequent result are false matches, the count for the total number of transactions processed and the count for the total number of false matches are incremented, while the true match count and the false non-match count are not.

Next, processing continues by determining whether or not a summary is to be generated that includes cumulative performance records 34. The determination may be made on a temporal or quantifiable basis. For example, a summary may be generated daily or after every one thousand subsequent authentication matching transactions. In other embodiments any basis may be used to determine whether the summary should be generated. It should be understood that all of the cumulative performance records are not required to be included in a summary, and that a summary may include any combination of cumulative performance records and performance metrics calculated therefrom. For example, the summary may include only the cumulative performance records of the total number of correct identification matches and the total number of attempted identification matches. Furthermore, performance metrics such as the matching accuracy and false acceptance rate of the BAC system may be calculated from the cumulative performance records by the BAC system itself and included in the summary. The BAC system 12 may calculate the matching accuracy using the total number of correct identification matches and the total number of attempted identification matches. In other methods, performance metrics may be included in the summary that are calculated from cumulative performance records not included in the summary. When a summary is not to be generated 34, processing continues by determining whether another request for authentication 36 has been received from the client system 14. If so, processing continues by capturing biometric data and conducting another initial authentication transaction 22. Otherwise, processing continues by generating a summary 34 including cumulative performance records, and providing the summary to the operator.

Next processing continues by determining the performance 38 of the BAC system 12. Specifically, the performance of the BAC system 12 is determined 38 by maintaining the cumulative performance records and calculating performance metrics such as, but not limited to, the accuracy and false hit rate of the BAC system 12. However, it should be appreciated that in other methods determining the performance 38 of the BAC system 12 may include comparing the cumulative performance records and calculated performance metrics against desired service levels of the BAC system 12. Such service levels may be, for example, a desired accuracy and a desired false hit rate of the BAC system 12. Moreover, in yet other methods, determining the performance 38 of the BAC system 12 may include comparing performance metrics of the initial and subsequent algorithms against performance metrics for alternative algorithms. As a result of the comparison, it may be decided to replace the initial and subsequent algorithms with the alternative algorithms.

In yet other methods, determining the performance 38 of the BAC system 12 may include comparing the cumulative performance records and calculated performance metrics included in the summary against what is possible using alternative operating thresholds of the BAC system 12. The desirable operating thresholds may be changed to cause a resultant change in the cumulative performance records and calculated performance metrics. For example, based on a number of missed matches, the operator may change parameters of the subsequent algorithm in an attempt to improve the matching accuracy performance of the subsequent algorithm and thus the matching accuracy of the BAC system 12. Such parameters include, but are not limited to, the predetermined threshold value used for determining potential matches. Consequently, the operator may decrease the predetermined threshold value to improve matching accuracy performance. It should be understood that the BAC system 12 may also change parameters of the subsequent algorithm based on the number of false matches. By virtue of determining the performance of the BAC system 12, the performance of the BAC system 12 and of the subsequent algorithm is tested.

After determining the performance 38 of the BAC system 12, processing continues by determining whether another request 36 for authentication has been received from the client system 14. When another authentication request has been received, processing continues by capturing biometric data and conducting another initial authentication matching transaction 22. Otherwise, processing ends 40. In the first exemplary method a continuous flow of incoming authentication matching transactions may be processed such that processing rarely ends 40.

In the first exemplary method the identity of the individual to be authenticated is successfully verified 22. However, it should be appreciated that when the identity of the individual is not successfully verified, the subsequent result is not expected to correspond to the claim of identity included in the authentication request. Instead, the subsequent result is expected to be different than the claim of identity.

Although the first exemplary method conducts the initial and subsequent authentication transactions using the gallery stored in the BAC system 12, it should be understood that in other embodiments the gallery may be stored in an authentication system different than the BAC system 12. Moreover, in other embodiments the gallery may be stored in a plurality of authentication systems that includes the BAC system 12.

The data record included in each test probe-data record pair functions as seed data in the subsequent authentication matching transaction. Thus, the data record may be referred to as a seed data record. Consequently, the test probe-seed data record pairs identified in the initial authentication matching transactions 22 represent valuable pairs of test probe-seed data for which expected results are known. As a result, the seed data record included in each test probe-seed data record pair may be obtained from the gallery of the BAC system 12 and used to support tests of the performance of biometric authentication systems different than the BAC system 12. The seed data record of each test probe-seed data record pair may be communicated from the BAC system 12 to the different authentication systems and inserted into a gallery database of each different authentication system, prior to communicating the corresponding test probe to at least one of the different authentication systems and testing the performance of the at least one different system. The at least one different authentication system is configured to test performance by conducting search transactions with the corresponding test probes and scoring the search transaction result on whether or not the at least one different authentication system successfully matched the seed data record. Consequently, it should be understood that as a result of conducting an initial authentication transaction such as a 1:1 verification transaction, test probes with known seed record data results are economically generated that may be used to conduct authentication transactions such as 1:N identification search transactions to thus test the performance of a same or different biometric authentication system.

It should be understood that the first exemplary method of testing performance of the BAC system 12 may be used to test the performance of biometric authentication computer systems responsible for managing hundreds of millions of identities. For example, an entity that administers a visa management program with a visa computer system may conduct initial authentication transactions in the form of 1:1 border verification transactions to facilitate ensuring that individuals at border crossings, who present visas for entry, are legitimate owners of the presented visas. Moreover, the visa system may conduct 1:N identification search transactions to facilitate removing duplicate visa data records from a gallery of visa data records stored therein. 1:N de-duplication systems are biometric authentication computer systems that function to facilitate ensuring that each data record is unique to a single individual such that a same individual is not associated with more than one data record in the gallery. Conducting such 1:1 border verification transactions facilitates providing inexpensive test probes, for conducting 1:N identification search transactions, that have known results and may be used to facilitate testing the performance of visa de-duplication systems. The known results are the seed records corresponding to the test probes.

Figure 3:
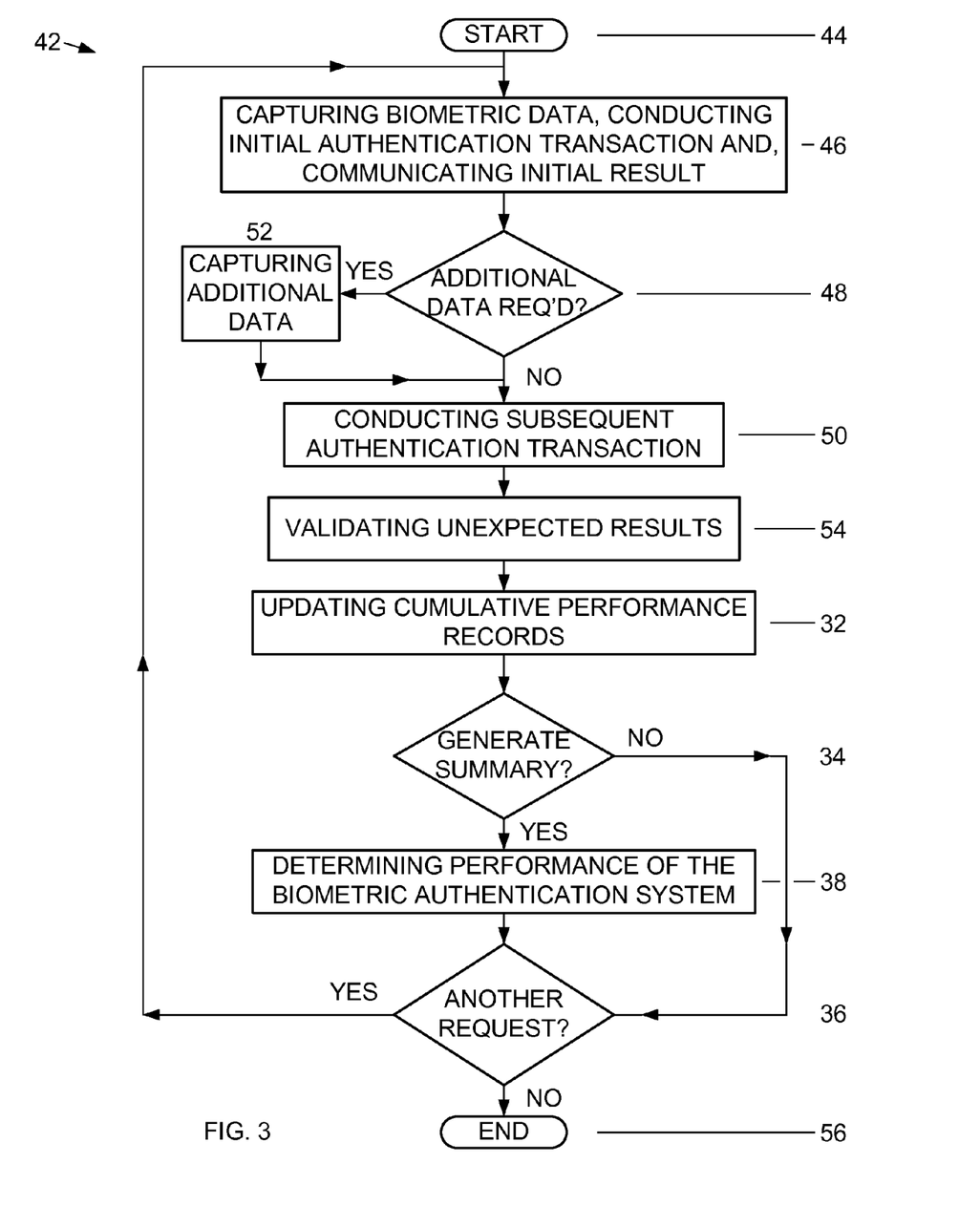
FIG. 3 is a flowchart illustrating a second exemplary method for testing the performance of the BAC system.

The information shown in FIG. 3 is substantially the same information shown in FIG. 2, as described in more detail below. As such, operations illustrated in FIG. 3 that are identical to operations illustrated in FIG. 2 are identified using the same reference numerals used in FIG. 2.

FIG. 3 is a flowchart 42 illustrating a second exemplary method for testing the performance of the BAC system 12. The second exemplary method is similar to that shown in FIG. 2. However, the second exemplary method executes different biometric authentication matching algorithms, and the initial and subsequent authentication matching transactions are both 1:N identification search transactions. Moreover, the performance of the BAC system 12 is determined using relative performance metrics.

The method starts 44 by determining at least an initial biometric authentication matching algorithm and a subsequent biometric authentication matching algorithm to be executed on the BAC system 12. The initial authentication transaction uses the initial algorithm and the subsequent authentication transaction uses the subsequent algorithm. The initial and subsequent algorithms may require biometric data of the same or different modality, or different data within the same biometric modality. Next, processing continues by capturing biometric data 46 required by the initial algorithm from an individual to be authenticated, and communicating the captured biometric data from a client system 14 to the BAC system 12. Upon receiving the captured biometric data, the BAC system 12 continues processing by including the captured biometric data in an initial identification probe and conducting the initial authentication transaction 46 in accordance with the initial algorithm. The initial algorithm conducts a 1:N identification search transaction. Thus, in the second exemplary method the initial authentication transaction is a 1:N identification search transaction and is conducted by comparing, in accordance with the initial algorithm, the initial identification probe against each data record in the gallery. The initial transaction may not determine any potential matches or may determine at least one potential match. The at least one determined potential match, or the lack of any determined potential matches, constitutes the result of the initial transaction. The result of the initial transaction is referred to in the second exemplary method as the initial result. The initial result is communicated 46 to the client system 14 from the BAC system 12.

Next, the BAC system 12 continues processing by determining whether additional biometric data is required 48 in order to conduct the subsequent authentication transaction. Specifically, the biometric data required by the initial algorithm is compared against the biometric data required by the subsequent algorithm. When the biometric data required by the initial and subsequent algorithms is the same, additional biometric data is not required 48 and processing continues by conducting the subsequent transaction 50. Specifically, the initial identification probe is compared against each of the records in the gallery in accordance with the subsequent algorithm to determine potential matches. The subsequent authentication transaction may not determine any potential matches or may determine at least one potential match. In the second exemplary method, the subsequent algorithm also conducts a 1:N identification search transaction. Thus, the subsequent transaction is a 1:N identification search transaction. The at least one determined potential match, or the lack of any determined potential matches, constitutes the result of the subsequent transaction. The result of the subsequent transaction is referred to in the second exemplary method as the subsequent result.

When the biometric data required by the initial algorithm is different than the biometric data required by the subsequent algorithm, additional biometric data is required 48. Processing continues by capturing additional biometric data 52 corresponding to the biometric data required by the subsequent algorithm from the individual at the client system 14, and communicating the additional biometric data to the BAC system 12. The additional biometric data may be obtained in any manner that facilitates collecting such data as described in the first exemplary method.

Processing continues by including the additional biometric data in the initial identification probe such that the additional biometric data supplements the biometric data included in the initial identification probe. However, in other methods the additional biometric data may be included in the initial identification probe such that the additional biometric data replaces the biometric data included in the initial identification probe. After including the additional biometric data in the initial identification probe, the initial identification probe may be used as a probe for conducting the subsequent transaction. The probe for conducting the subsequent transaction is referred to herein as a subsequent transaction probe. All captured or obtained biometric data is included in the initial and subsequent identification probes as biometric template data. Processing continues by conducting the subsequent transaction 50 by comparing the subsequent identification probe against each record in the gallery of the BAC system 12 in accordance with the subsequent algorithm, and generating the subsequent results of the transaction 50. The subsequent transaction may not determine any potential matches, or may determine at least one potential match. Next, the BAC system 12 compares the initial result against the subsequent result to determine a number of potential matches that are included in each of the initial and subsequent results. When the initial and subsequent results both include a same potential match, operator review is typically not required before declaring the same potential match a true match. However, operator review may be required before declaring the same potential match a true match. When a potential match is included in only one of the initial and subsequent results, but not both, the potential match is considered an unexpected result and constitutes a difference between the initial and subsequent results. Processing continues by validating such unexpected results 54. Specifically, the unexpected results are reviewed by the operator to determine whether the potential match is a true match or a false match. This difference between the initial and subsequent results facilitates determining the performance of the BAC system 12 even though true matches of the initial and subsequent transactions were unknown prior to conducting the transactions.

In the second exemplary method, the BAC system 12 stores cumulative performance records for at least the initial and subsequent results, true matches included in both the initial and subsequent results, true matches included only in the initial result, true matches included only in the subsequent result, false matches included in the initial result, and false matches included in the subsequent result. A cumulative performance record for false matches is not required to be stored for determining or comparing accuracy, but is typically stored when measuring performance of biometric authentication systems. Processing continues by updating 32 cumulative performance records effected by the initial and subsequent transactions. Specifically, each of the cumulative performance records affected by the initial and subsequent transactions is incrementally increased based on one of the initial result, the subsequent result, the true matches, the false matches and the false non-matches.

Next, processing continues by determining, in the same manner as described with regard to the first exemplary method, whether or not a summary is to be generated that includes the cumulative performance records 34. It should be understood that the matching accuracy and false acceptance rate of the BAC system 12 may be determined by the BAC system itself from the cumulative performance records and included in the summary.

After generating the summary 34, the performance of the BAC system 12 is determined 38 in a similar manner as described with regard to the first exemplary method, but with the addition of determining at least the relative performance between the initial and subsequent algorithms using the cumulative performance records. It should be understood that a number of true matches included in the initial result only and a number of true matches included in the subsequent result only may be used for calculating relative performance metrics between the initial and subsequent algorithms. For example, 100,000–1:N identification search transactions may be conducted in accordance with both the initial and subsequent algorithms, such that 100,000 initial identification probes are compared against the gallery in accordance with the initial algorithm and 100,000 subsequent identification probes are compared against the gallery in accordance with the subsequent algorithm. When the gallery includes 10,000 true matches, an initial algorithm that is 80% accurate should generate a total of 8,000 true matches as a result of the 100,000–1:N identification search transactions. As a result of the 1:N identification transactions conducted in accordance with a subsequent algorithm that is 98% accurate, 9,800 true matches may be generated, 7,900 of which are also generated by the initial algorithm and 1,900 of which are generated by the subsequent algorithm only. The 7,900 true matches are common matches between the initial and subsequent algorithms and 100 true matches are generated by the initial algorithm only. For purposes of this example, 100 data records that constitute a true match with one of the probes are not detected as potential matches by either the initial or subsequent algorithms. However, in a system such as the BAC system 12, it would not be known from such data whether the number of data records that were not detected by either algorithm was 100 or some other number. In such situations, it is frequently useful to understand the relative performance of biometric algorithms. It should also be appreciated that a relative performance metric may be converted into an absolute performance metric by virtue of knowing or estimating a single additional metric, namely the accuracy of either the initial or subsequent algorithm.

Consequently, for this example, the relative accuracy of the initial and subsequent algorithms may be determined by comparing their performance metrics for known false non-matches. For purposes of this example, the initial algorithm failed to match on 1,900 known true matches that were successfully identified by the subsequent algorithm plus an unknown number M of true matches not detected by either algorithm. At the same time, the subsequent algorithm failed to match on 100 true matches that were successfully identified by the initial algorithm plus the M true matches not determined by either algorithm. As a result, the relative false non-match rate of the subsequent algorithm compared to the initial algorithm is $(100+M)/(1,900+M)$ times that of the initial algorithm. Because accuracy can be computed as 100% minus the false non-match rate, if the accuracy of either algorithm is known, the accuracy of the other can be computed. If the accuracy of the initial algorithm is known from a separate test to be 80%, the false non-match rate of the initial algorithm should be 20% which implies that M=100. A relative non-match rate for the subsequent algorithm may be determined as $(100+100)/(1,900+100)$, which equate to one-tenth the false non-match rate of the initial algorithm, or $1/10 \times 20\% = 2\%$. Thus, the accuracy of the subsequent algorithm is 100% minus 2%, or 98%.

False match rates of the initial and subsequent algorithms can be calculated more directly. If all potential matches identified by either the initial or subsequent algorithm are examined by the BAC system operator to confirm whether they are true matches or false matches, the false match rates for each algorithm can be computed from the cumulative performance records for the numbers of transactions and numbers of false hits. Consequently, when the initial algorithm generates a total of 3,000 false matches for the 100,000 transactions, the initial algorithm false match rate is 3,000/100,000, or 3%. Likewise, when the subsequent algorithm generates a total of 50 false matches for the 100,000 transactions, the subsequent algorithm false match rate is 50/100,000, or 0.05%.

After determining the performance 38 of the BAC system 12, processing continues by determining whether another request 36 for authentication has been received from the client system 14. When another authentication request has been received, processing continues by capturing biometric data and conducting another initial authentication matching transaction 46. Otherwise, processing ends 56. In the second exemplary method a continuous flow of incoming authentication matching transactions may be processed such that processing rarely ends 56.

The performance of authentication systems such as the BAC system 12 may be determined using the relative performance metrics generated by conducting 1:N identification search transactions in accordance with the initial and subsequent algorithms. It should be appreciated that the number of true matches missed by both the initial and subsequent algorithms may be estimated by using another biometric matching algorithm of known accuracy. Alternatively, the number of true matches missed by both the initial and subsequent algorithms may be estimated by virtue of a separate test that independently determines the accuracy of either the initial or subsequent algorithm.

For example, in the example described previously, the number of true matches missed by both the initial and subsequent algorithms may be 100. Because the number of true matches is not known prior to conducting the transactions, different values for the number of true matches missed could be estimated and a range of values for the number of true matches missed could be assessed that is consistent with other determined BAC system metrics. For instance, in the previous example, accuracy of the initial and subsequent algorithms may be estimated to be at least 60% and 90%, respectively. Such accuracy estimations may be extrapolated to estimate the number of true matches missed by both the initial and subsequent algorithms as ranging between 0 and 4,000. However, only the values 0 to 989 are consistent with the estimated accuracy of at least 60% for the initial and 90% for the subsequent algorithm. That is, (7,900+1,900) true matches divided by (7,900+1,900+100+989) potential matches equals 90%. Using the consistent range of values yields an estimated accuracy for the initial algorithm of between 73% and 81%, and for the subsequent algorithm of between 90% and 99%.

It should be understood that in other alternative methods, relative accuracies may also be used to calculate BAC system performance metrics by using a small volume of seeded test data to directly estimate the unknown number M of true matches not detected by either algorithm. In such embodiments, a small volume of test data is defined as anything less than 10% of the total transaction volume, and may be as few as 100 or 1,000 paired gallery seeds and test probes for this example. If the small volume of test data showed the unknown number M of true matches to be approximately 1% of the total transaction volume, then all the benefits of accuracy measurement using operational data can be achieved at the very low cost of obtaining the small volume of non-operational test data. Using the data from the example discussed previously, if 1,000 test probe-seed data record pairs in the gallery showed M to be 1%, an estimated value of M could be determined from the equation M=0.01(100+7,900+1,900+M). Solving for M yields an estimate of M=100 for this example, which can be used to calculate all the other false non-match rate and accuracy metrics.

It should be understood that relative performance metrics of alternative biometric authentication matching algorithms may be determined that facilitate determining the absolute performance of biometric authentication systems and thus testing of such biometric authentication systems. The cumulative performance records described in the second exemplary method result solely from the processing of operational data. Thus, performance metrics of the BAC system 12 may be determined using only operational data. By virtue of using only operational data, the data used to conduct authentication transactions is completely representative of the BAC system 12, occurs in volumes that are easily 10 to 1,000 times greater than that available using traditional test methods, and facilitates reducing costs associated with volumes of representative test data including more than 10,000 paired gallery seeds and test probes.

Although the first and second exemplary methods as described herein conduct a subsequent authentication transaction after each initial authentication transaction, in other embodiments a subsequent transaction may not be conducted after each initial transaction. Instead, a subsequent transaction may be conducted after each initial authentication transaction that is included in a subset of initial authentication transactions.

Figure 4:
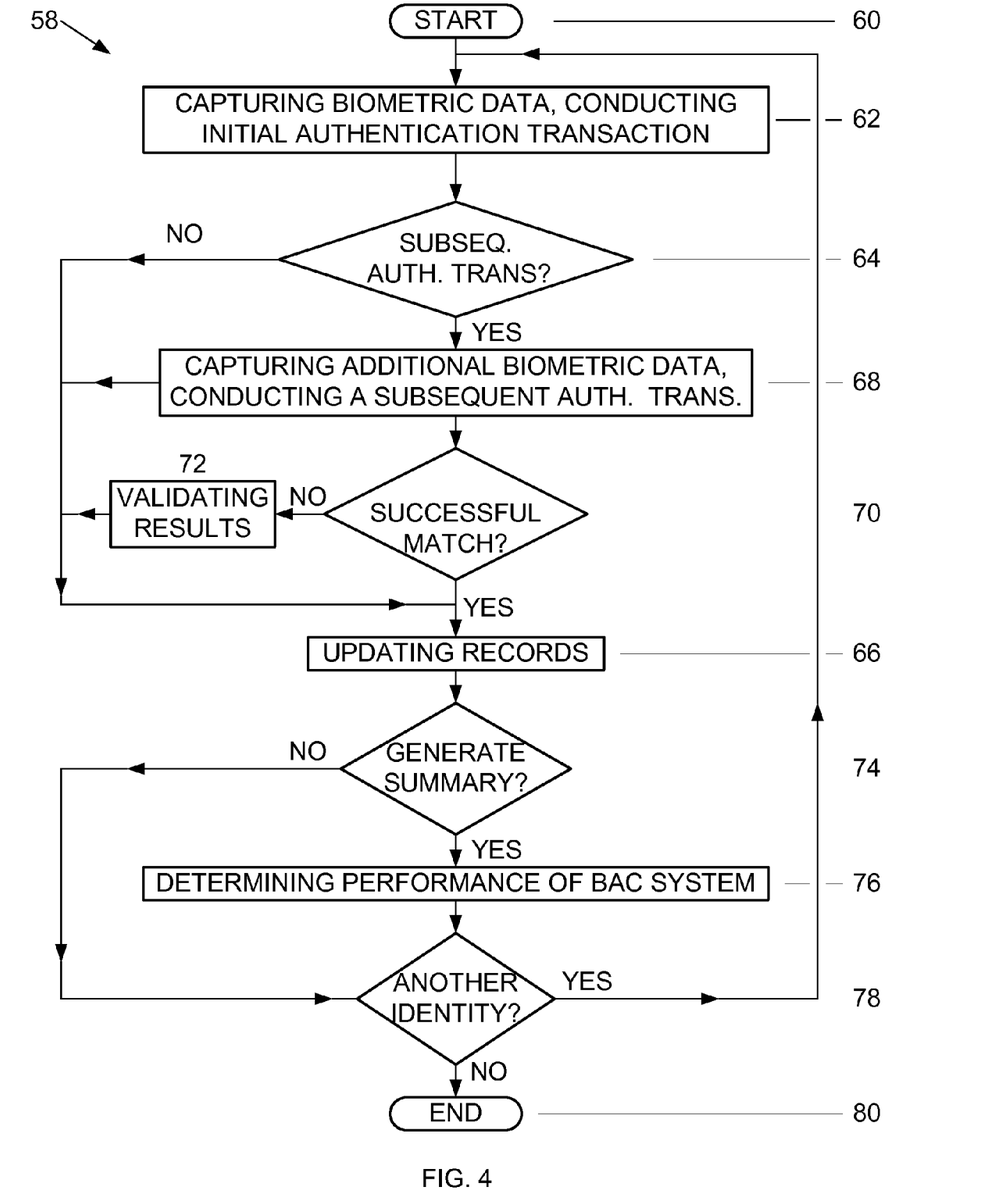
FIG. 4 is a flowchart illustrating a third exemplary method for testing the performance of the BAC system.

FIG. 4 is a flowchart 58 illustrating a third exemplary method for testing the performance of the BAC system 12 that randomly determines whether a subsequent authentication transaction is to be conducted after an initial authentication transaction. The initial transaction uses an initial biometric authentication matching algorithm and the subsequent transaction uses a subsequent biometric authentication matching algorithm. The initial and subsequent algorithms may require biometric data of the same or different modality, or different data within the same biometric modality. Next, processing continues by capturing biometric data 62 required by the initial algorithm from an individual, obtaining a claim of identity from the individual, and generating an initial probe that includes the captured biometric data. Processing continues by conducting the initial transaction 62 in accordance with the initial algorithm and generating a result. The initial algorithm conducts a 1:1 verification transaction. Thus, in the third exemplary method the initial transaction is a 1:1 verification transaction. The initial authentication transaction is conducted by comparing, in accordance with the initial algorithm, the initial probe against a biometric data record included in the gallery that is associated with the claim of identity. As a result of the initial authentication transaction, the captured biometric data and the biometric data record are determined to constitute a match or a non-match. The match or non-match determination is the generated result and is referred to as the initial result in the third exemplary method.

Next, processing continues by randomly determining whether a subsequent authentication transaction is to be conducted 64 for the individual in accordance with the subsequent algorithm. The subsequent algorithm conducts a 1:1 verification transaction. Thus, in the third exemplary method the subsequent transaction is a 1:1 verification transaction. When a subsequent transaction is not to be conducted 64, processing continues by updating the cumulative performance records 66. However, when a subsequent transaction is to be conducted 64 the biometric data required by the initial and subsequent algorithms is compared to determine whether the biometric data required by the initial algorithm is different than the biometric data required by the subsequent algorithm. When the biometric data requirements are different, processing continues by capturing additional biometric data 68 from the individual, at the client system 14, corresponding to the biometric data required by the subsequent algorithm and communicating the additional biometric data to the BAC system 12. The additional biometric data may be obtained in any manner that facilitates collecting such data as described in the first exemplary method.

Processing continues by including the additional biometric data in the initial probe such that the additional biometric data supplements the biometric data included in the initial probe. However, in other methods the additional biometric data may be included in the initial identification probe such that the additional biometric data replaces the biometric data included in the initial probe. After including the additional biometric data in the initial probe, the initial probe may be used as a probe for conducting the subsequent transaction. The probe for conducting the subsequent transaction is referred to herein as a subsequent probe. All captured or obtained biometric data is included in the initial and subsequent identification probes as biometric template data.

Processing then continues by conducting the subsequent transaction 68 and generating a result for the subsequent authentication transaction by comparing, in accordance with the subsequent algorithm, the subsequent probe against the biometric data record. As a result of the subsequent transaction, the additional biometric data and the biometric data record associated with the claim of identity are determined to either match or not match. The subsequent match or non-match is the generated result and is referred to as the subsequent result in the third exemplary method. When the initial and subsequent results both indicate a successful match 70 the individual is not an imposter and processing continues by updating the cumulative performance records 66. However, when at least one of the initial and subsequent results does not indicate a successful match 70, processing continues by validating 72 the initial and subsequent results. Specifically, processing continues by manually comparing the first and second probes against the biometric data record associated with the claim of identity, to determine whether the BAC system 12 correctly determined the initial and subsequent results. When either the initial or subsequent results are validated as non-matches, the individual is considered to be an imposter attempting to perpetuate a hostile attack upon the BAC system 12.

Although the initial and subsequent results are manually validated 72 in the third exemplary method, in other methods the initial and subsequent results may be validated in any manner including, but not limited to, processing the additional biometric data in the BAC system 12 to yield a third match result. In such other methods, the initial, subsequent and third match results may be compared to determine if any 2 of the initial, subsequent and third match results agree. When any 2 of the 3 match results agree, the agreeing match result is considered to be the validation result.

Although additional biometric data is captured 68 in the third exemplary method, it should be appreciated that in other methods capturing additional biometric data to support the subsequent algorithm may not be necessary.

In the third exemplary method, the BAC system 12 processes the initial and subsequent results to update cumulative performance records stored therein. The BAC system 12 stores at least a cumulative performance record for the number of imposters that have attacked the BAC system 12. It should be understood that the third exemplary method facilitates measuring the performance of the BAC system 12 as well as the number of attempted imposter attacks on the BAC system 12.

After validating the initial and subsequent results 72, processing continues by updating the cumulative performance records 66. Specifically, the cumulative performance records affected by the initial and subsequent transactions are incrementally increased based on the initial and subsequent results. Next, processing continues by determining 74, in the same manner as described with regard to the first exemplary method, whether or not a summary is to be generated that includes the cumulative performance records. When a summary is not to be generated 74, processing continues by determining if another identity is to be processed 78, and if so capturing biometric data 62 from another individual. However, when a summary is to be generated 74, the cumulative performance records and desired performance metrics that may be calculated therefrom are to be included in the summary in substantially the same manner as described in the first exemplary method. In the third exemplary method, the match accuracy and false acceptance rate may be determined by the BAC system 12 itself and may be included in the summary. The summary may also include the cumulative performance record for the number of attempted imposter attacks on the BAC system 12.

The summary may be provided to the operator of the BAC system 12 in any manner including, but not limited to, on a computer display or in a printout. When a summary is to be generated, processing continues by generating a summary 74 including cumulative performance records and performance metrics.

After generating the summary 74, the performance of the BAC system 12 is determined 76 in the same manner as described with regard to the first exemplary method. By virtue of determining the performance 76 of the BAC system 12, it should be understood that the performance of the initial and subsequent algorithms is also determined. For example, the performance of the BAC system 12 may be determined by determining the rate of false non-matches using the cumulative total number of non-matches for the initial transaction that were contradicted by matches from the subsequent transaction, and comparing the false non-match rate against an acceptable false non-match rate. When the false non-match rate is less than or equal to the acceptable false non-match rate, performance of the BAC system 12 is satisfactory. However, when the false non-match rate is greater than the acceptable false non-match rate, performance of the BAC system 12 is unsatisfactory. By virtue of determining the performance of the BAC system 12 as satisfactory or unsatisfactory, the performance of the BAC system 12 and of the initial and subsequent algorithms is tested.

When performance of the BAC system 12 is unsatisfactory at least one parameter of the initial algorithm and at least one parameter of the subsequent algorithm may be adjusted by the BAC system itself in an attempt to improve performance of the BAC system 12. The at least one parameter includes, but is not limited to, the predetermined threshold value used for determining potential matches. Thus, for example, the predetermined threshold value used for determining matches may be decreased. Alternatively, the operator may adjust at least one parameter of the initial and subsequent algorithms. After determining the performance 76 of the BAC system 12, processing continues by determining whether another identity 78 is to be authenticated. If so, processing continues by capturing biometric data 62 required by the initial algorithm from another individual. Otherwise, processing ends 80. In the third exemplary method a continuous flow of incoming authentication matching transactions may be processed such that processing rarely ends 80.

It should be understood that the third exemplary method facilitates generating false acceptance performance data of the BAC system 12, false non-match performance data of the BAC system 12, and the number of attempted impostor attacks on the BAC system 12 from individuals inadvertently asserting non-matching identities or deliberately asserting non-matching identities as an attack on the BAC system 12. Such data, and particularly the imposter attack rate data, may also be desired for determining political and security policy decisions for biometric authentication systems.

Figure 5:
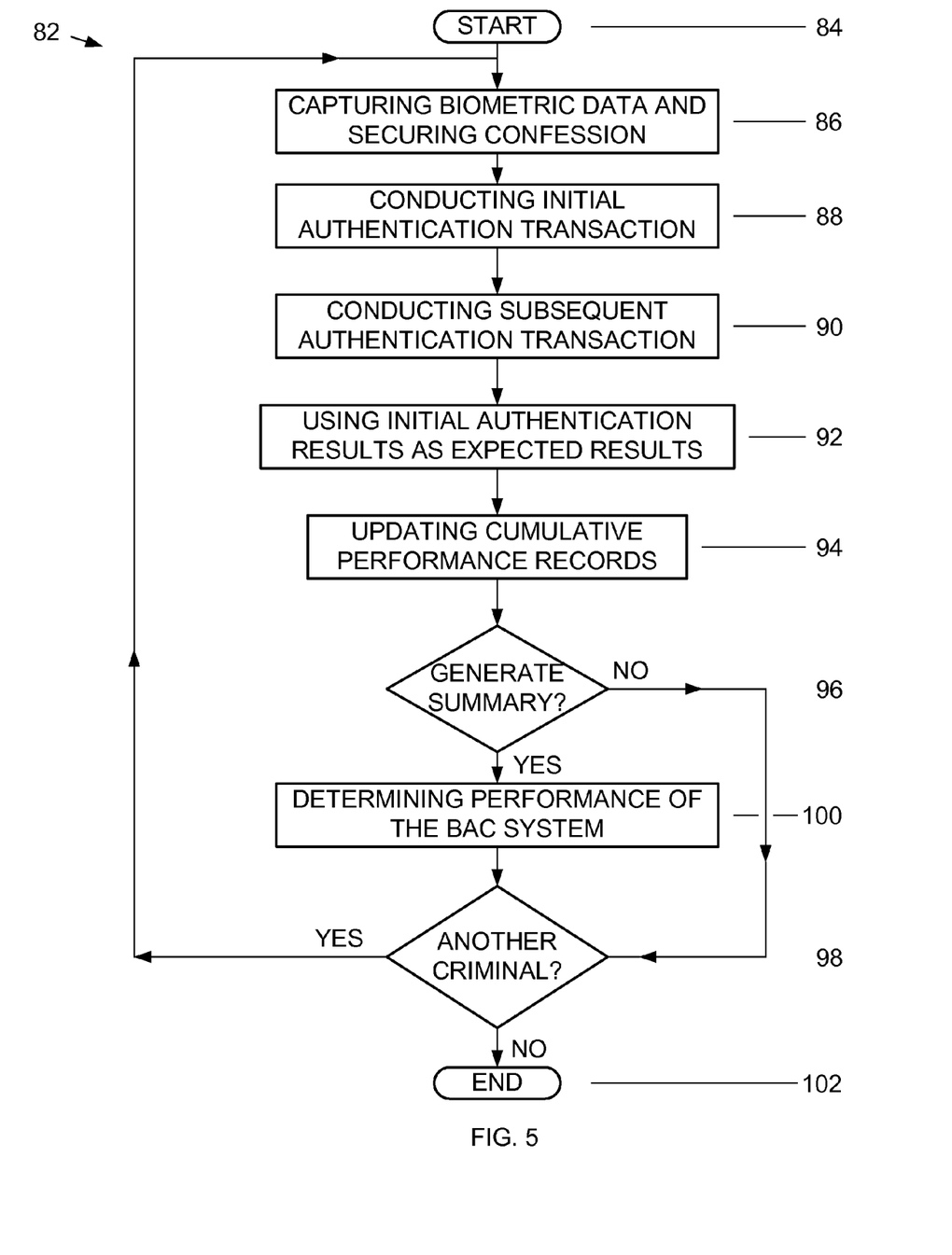
FIG. 5 is a flowchart illustrating a fourth exemplary method for testing the performance of the BAC system.

FIG. 5 is a flowchart 82 illustrating a fourth exemplary method for testing the performance of the BAC system 12 that uses unsolved latent fingerprint biometric data paired with matching captured fingerprint biometric data. Unsolved latent fingerprints are fingerprints obtained from a crime scene that law enforcement personnel have been unable to associate with an individual. In the fourth exemplary method, the gallery stored in the BAC system 12 contains data records of unsolved latent fingerprint biometric data that are each associated with a particular crime. There may be multiple unsolved latent prints associated with each crime, but the quantity of unsolved latent prints per crime is generally less than one hundred.

The method starts 84 by capturing biometric data from a recently detained criminal 86 suspected of committing a new crime, obtaining a claim of identity from the criminal, and securing a confession 86 for at least one different crime from the criminal. Such confessions have been known to occur, especially when police have the leverage of strong evidence against the criminal regarding the new crime, and the criminal wants to trade information on old crimes in return for a reduced sentence on the new crime. A full set of fingerprints is typically captured as the biometric data when the criminal is taken into custody for the new crime by law enforcement personnel. However, in other methods the biometric data may be captured before or after securing a confession from the criminal. The captured biometric data is processed into an initial probe. Although the biometric data is captured from the criminal in the fourth exemplary method, in other methods the biometric data may be obtained from a database of previously obtained biometric data. The database of previously obtained biometric data may be included in the BAC system 12 or in another different computer system.

Next, processing continues by determining an initial biometric authentication matching algorithm for conducting an initial authentication matching transaction, conducting the initial authentication matching transaction 88, and generating results for the initial transaction. The initial transaction is conducted 88 by comparing the initial probe against the unsolved latent fingerprint biometric data record, or records, associated with the at least one different crime being confessed, in accordance with the initial algorithm. In the fourth exemplary method, the initial algorithm conducts a 1:1 verification transaction. Thus, the initial transaction is a 1:1 verification transaction in the fourth exemplary method. It should be understood that a series of 1:1 verification transactions may be conducted between the initial probe and the unsolved latent fingerprint data associated with the at least one different crime. Specifically, the biometric data for each fingerprint included in the initial probe may be compared against each unsolved latent fingerprint biometric data record associated with the at least one different crime in accordance with the initial algorithm. The number of such 1:1 verifications depends on the number of unsolved latent prints associated with the at least one different crime, whether finger numbers of the unsolved latent prints are known, and the number of fingers in the initial probe transaction. It should also be understood that 1:1 verification transactions involving latent fingerprints may involve review by the BAC system operator, or may be conducted entirely manually with no automated support for the initial transaction.

When at least one match is detected between the initial probe and the unsolved latent fingerprint biometric data records, the at least one detected matching unsolved latent fingerprint biometric data record is identified as latent test data and is stored in the BAC system 12. In other methods, the latent test data may be stored in a system different than the BAC system 12. The initial probe and the latent test data are determined to constitute a successful match. The successful match constitutes the result of the initial transaction and is referred to in the fourth exemplary method as the initial result. The latent test data is processed to generate a latent test probe that is associated with the captured fingerprint biometric data record stored in the BAC system 12. By associating the latent test probe with the captured fingerprint biometric data record, a test probe-seed data record pair, respectively, is established. Thus, the unsolved latent fingerprint biometric data is paired with the matching captured fingerprint biometric data. The test probe-seed data record pair is stored in the BAC system 12. However, in other methods the test probe-seed data record pair may be stored in a system different than the BAC system 12.

It should be understood that data associated with the latent test data, such as a finger allowance assigned to the at least one detected matching latent fingerprint biometric data record by a fingerprint examiner, may be considered additional data. The finger allowance is the range of fingers that the fingerprint examiner believes might correspond to the at least one detected matching latent fingerprint biometric data record. Moreover, there may be other data recorded about the at least one detected matching latent fingerprint, such as the type of surface or location where the at least one detected matching latent fingerprint was collected, the method used to collect the at least one detected matching latent fingerprint, or the type of crime involved. However, such additional data may not replace the latent test data in the latent test probe.

Processing continues by determining a subsequent biometric authentication matching algorithm for conducting a subsequent authentication transaction, storing the captured fingerprint biometric data record in the gallery as a seed data record, and conducting the subsequent transaction 90. In the fourth exemplary method the subsequent algorithm conducts a 1:N identification search transaction. Thus, the subsequent transaction is a 1:N identification search transaction and is conducted by comparing the latent test probe against the gallery in accordance with the subsequent algorithm. The subsequent transaction may not determine a match with any data records or may determine at least one data record in the gallery that potentially matches the latent test probe. The at least one data record, or the lack of any data records, constitutes the result of the subsequent authentication transaction. The result of the subsequent authentication transaction is referred to in the fourth exemplary method as the subsequent result. Any potentially matching data record included in the subsequent result should include the seed data record. Any potentially matching data record may be processed into a list referred to as a candidate list. The candidate list may include up to C data records, where C is generally set to a value less than twenty.

The initial result is used as the result expected from the subsequent transaction 92. Consequently, because the captured biometric data included in the initial probe was determined to successfully match the latent test data, the captured biometric data is used as the result expected from the subsequent transaction. Thus, after conducting the subsequent transaction the initial result is used 92 to determine if any potentially matching data record included in the subsequent result is a true match or a false match.

The BAC system 12 processes the initial result and the subsequent result to update the cumulative performance records stored therein. After determining which of the subsequent transaction results are true matches and which are false matches, processing continues by updating cumulative performance records 94 based on the initial and subsequent results. Specifically, each cumulative performance record affected by at least one of the initial and subsequent transactions is incrementally increased. Moreover, the true matches in the candidate list returned from 1:N latent searches may be ranked. That is, a separate cumulative performance record may exist for each position in the candidate list, where true matches at the top of the list have the highest rank and are thus referred to as "rank 1."

Next, processing continues by determining, in the same manner as described with regard to the first exemplary method, whether or not a summary is to be generated 96 that includes the cumulative performance records. When a summary is not to be generated 96, processing continues by determining whether biometric data is to be captured from another detained criminal 98. Otherwise, processing continues by generating a summary 96 including the cumulative performance records. The summary may be provided to the operator of the BAC system 12 in any manner including, but not limited to, on a computer display or in a printout.

After generating the summary 96, performance of the BAC system 12 is determined 100 in the same manner as described with regard to the first exemplary method. By virtue of determining the performance of the BAC system 12, it should be understood that the performance of the subsequent algorithm is also determined. For example, if the cumulative total number of correct identification matches is seventy-five and the total number of attempted identification matches is one hundred, then the BAC system 12 and the subsequent biometric authentication matching algorithm used to determine the cumulative number of correct identification matches, are determined to function at a seventy-five percent matching accuracy. Thus, the performance of the BAC system 12 and the performance of the subsequent algorithm are both tested as having a seventy-five percent matching accuracy.

Based on a number of the missed matches, parameters of the subsequent algorithm may be changed in an attempt to improve the matching accuracy performance of the subsequent algorithm and thus the matching accuracy of the BAC system 12. Such parameters include, but are not limited to, the predetermined threshold value used for determining potential matches. Thus, for example, the predetermined threshold value used for determining matches may be decreased in the subsequent algorithm. By virtue of determining the performance of the BAC system 12, the performance of the BAC system 12, and of the initial and subsequent algorithms are also tested. After determining the performance 100 of the BAC system 12, processing continues by determining whether biometric data is to be captured from another detained criminal 98. If so, processing continues by capturing biometric data 86 from the other detained criminal. Otherwise, processing ends 102.

Although the gallery is stored in the BAC system 12 in the fourth exemplary method, it should be understood that in other embodiments the gallery may be stored in a plurality of different authentication systems. In yet other embodiments the gallery may be stored in a computer system different than the BAC system 12. By virtue of comparing the latent test probe against the gallery stored in a different authentication system, performance of the different authentication system may be determined. Thus, it should be appreciated that in other methods the latent test probe and captured fingerprint biometric data record may be used as a test probe-seed pair that may be used to determine the performance of biometric authentication systems different than the BAC system 12, and thus to also test the performance of the different authentication systems. In such other methods, the captured fingerprint biometric data record should be stored in the different authentication system as a seed data record prior to conducting the subsequent authentication transaction.

In the fourth exemplary method the captured biometric data and latent test data constitute a successful match. However, it should be appreciated that when the captured biometric data and latent test data constitute a non-match, the results from the subsequent authentication transaction are not expected to correspond to the claim of identity of the criminal. Instead, the results from the subsequent authentication transaction will be expected to be a non-match.

Although the summary is generated before determining the performance of the BAC system 12 in the exemplary methods described herein, in other methods the performance of the BAC system 12 may be determined before generating the summary.

Although the cumulative performance records are incrementally increased using the transaction results in the exemplary methods described herein, in other methods the cumulative performance records may be updated using any method that facilitates testing the performance of biometric authentication systems as described herein. Such other methods include, but are not limited to, recording matching scores of each comparison conducted during the subsequent transaction and recording the top X matching scores, where X is a number between one and the number of data records in the gallery. Recording the matching scores of each comparison facilitates calculating a cumulative total of true matches, a cumulative total of false matches, and a cumulative total of false non-matches based on multiple potential settings of a matching threshold.

The above described exemplary methods of testing the performance of biometric authentication systems facilitate regularly and economically validating performance metrics associated with biometric authentication systems responsible for managing hundreds of millions of identities using data that represents actual conditions. More specifically, the results of an initial biometric authentication transaction may be used to update cumulative performance records of the biometric authentication system. Moreover, the results of the initial biometric authentication transaction may be used in a subsequent authentication transaction such that results of the subsequent authentication transaction may be used to update the cumulative performance records. The cumulative performance records and performance metrics that may be calculated therefrom are included in a summary such that an individual associated with the biometric authentication system may determine the performance of the biometric authentication system in view of the summary, and adjust parameters of matching algorithms used to conduct the initial and subsequent transactions in order to improve performance of the biometric authentication system. By virtue of processing the results of the initial and subsequent biometric transactions, the costs, time and difficulty of obtaining biometric data required for testing the performance of biometric authentication systems is facilitated to be reduced.

While the invention has been described in terms of various specific embodiments, those skilled in the art will recognize that the invention can be practiced with modification within the spirit and scope of the claims.

What is claimed is:

1. A method of testing the performance of a biometric authentication computer system comprising:

conducting, by the biometric authentication computer system, a verification authentication transaction using a verification probe, the verification probe including biometric data captured from a user;

generating, by the biometric authentication computer system, an initial result when the verification probe matches a data record;

determining whether at least part of biometric data required for conducting a subsequent authentication transaction is different than the biometric data included in the verification probe;

obtaining additional biometric data from the user when at least part of the required biometric data is different;

including the additional biometric data in the verification probe to form an identification probe;

conducting, by the biometric authentication computer system, the subsequent authentication transaction using the identification probe and generating a subsequente result, the subsequent authentication transaction being an identification biometric authentication transaction and the subsequent result including potential matching records;

comparing, by the biometric authentication computer system, the matching data record against the potential matching records, each potential matching record that matches the matching data record being a true match;

updating cumulative performance records based on at least the true matches;

generating a summary on a temporal or quantifiable basis, the summary including the cumulative performance records; and determining the performance of the biometric authentication computer system using the cumulative performance records or the summary.

2. A method in accordance with claim 1, further comprising:

identifying the verification probe and matching data record as a probe-seed data record pair, the matching data record being stored in the biometric authentication computer system;

inserting the matching data record into a gallery database of a different authentication computer system; and conducting said generating the subsequent result step on the different authentication computer system using the verification probe and scoring the search transaction result on whether the different authentication computer system successfully matches the matching data record.

3. A method in accordance with claim 1, said determining biometric authentication system performance step comprising determining a matching accuracy and a false acceptance rate of the biometric authentication system.

4. A computer program recorded on a non-transitory computer-readable recording medium included in a biometric authentication computer system for enabling regular performance testing of the biometric authentication computer system, the computer program being comprised of instructions, which when read and executed by the biometric authentication computer system, cause the biometric authentication computer system to:

conduct a verification authentication transaction using a verification probe, the verification probe including biometric data captured from a user;

generate an initial result when the verification probe matches a data record;

determine whether at least part of biometric data required for conducting a subsequent authentication transaction is different than the biometric data included in the verification probe;

include additional biometric data in the verification probe to form an identification probe, the additional biometric data being obtained from the user when at least part of the required biometric data is different;

conduct the subsequent authentication transaction using the identification probe and generate a subsequent result, the subsequent authentication transaction being an identification biometric authentication transaction and the subsequent result including potential matching records;

compare the matching data record against the potential matching records, each potential matching record that matches the matching data record being a true match;

update cumulative performance records based on at least the true matches;

generate a summary on a temporal or quantifiable basis, the summary including the cumulative performance records; and determine the performance of the biometric authentication system using the cumulative performance records or the summary.

5. A biometric authentication computer system comprising:

a processor; and a memory configured to store data, said biometric authentication computer system being associated with a network and said memory being in communications with said processor and having instructions stored thereon which, when executed by said processor, cause said processor to:

conduct a verification authentication transaction using a verification probe, the verification probe including biometric data captured from a user;

generate an initial result when the verification probe matches a data record;

determine whether at least part of biometric data required for conducting a subsequent authentication transaction is different than the biometric data included in the verification probe;

include additional biometric data in the verification probe to form an identification probe, the additional biometric data being obtained from the user when at least part of the required biometric data is different;

conduct the subsequent authentication transaction using the identification probe and generate a subsequent result, the subsequent authentication transaction being an identification biometric authentication transaction and the subsequent result including potential matching records;

compare the matching data record against the potential matching records, each potential matching record that matches the matching data record being a true match;

update cumulative performance records based on at least the true matches;

generate a summary on a temporal or quantifiable basis, the summary including the cumulative performance records; and determine the performance of said biometric authentication computer system using the cumulative performance records or the summary.

6. A biometric authentication computer system in accordance with claim 5, the instructions, which when executed by said processor further cause said processor to incrementally increase each cumulative performance record affected by the true matches, wherein each cumulative performance record maintains a count for each one of a plurality of difference performance metrics of said biometric authentication computer system.

7. A biometric authentication computer system in accordance with claim 5, the instructions, which when executed by said processor further cause said processor to calculate relative performance metrics between an initial algorithm used for conducting the verification transaction and a subsequent algorithm used for conducting the subsequent authentication transaction, using the true matches.

8. A method for testing the performance of a biometric authentication computer system comprising:

determining, by the biometric authentication computer system, whether at least part of biometric data required for conducting a subsequent authentication transaction is different than the biometric data included in a verification probe used for conducting an initial verification authentication transaction;

obtaining additional biometric data from the user when at least part of the required biometric data is different;

including the additional biometric data in the verification probe to form an identification probe;

conducting, by the biometric authentication computer system, the subsequent authentication transaction using the identification probe and generating a subsequent result, the subsequent authentication transaction being an identification biometric authentication transaction and the subsequent result including potential matching records;

comparing the matching data record against the potential matching records, each potential matching record that matches the matching data record being a true match;
updating cumulative performance records based on at least the true matches;
generating a summary on a temporal or quantifiable basis, the summary including the cumulative performance records; and
determining the performance of the biometric authentication computer system using the cumulative performance records or the summary.

* * * * *